US011237351B2

(12) United States Patent
Suzuki

(10) Patent No.: US 11,237,351 B2
(45) Date of Patent: Feb. 1, 2022

(54) LENS DRIVE DEVICE

(71) Applicant: TDK CORPORATION, Tokyo (JP)

(72) Inventor: Akira Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 370 days.

(21) Appl. No.: 16/508,604

(22) Filed: Jul. 11, 2019

(65) Prior Publication Data

US 2020/0018919 A1    Jan. 16, 2020

(30) Foreign Application Priority Data

Jul. 11, 2018   (JP) .............................. JP2018-131716

(51) Int. Cl.
| | |
|---|---|
| *G02B 7/02* | (2021.01) |
| *G02B 7/09* | (2021.01) |
| *G02B 7/08* | (2021.01) |
| *H04N 5/232* | (2006.01) |
| *H04N 5/225* | (2006.01) |
| *G03B 3/02* | (2021.01) |
| *G03B 5/02* | (2021.01) |

(52) U.S. Cl.
CPC ............... *G02B 7/023* (2013.01); *G02B 7/08* (2013.01); *G02B 7/09* (2013.01); *G03B 3/02* (2013.01); *G03B 5/02* (2013.01); *H04N 5/2252* (2013.01); *H04N 5/2253* (2013.01); *H04N 5/2254* (2013.01); *H04N 5/232* (2013.01); *G03B 2205/0069* (2013.01)

(58) Field of Classification Search
None
See application file for complete search history.

(56) References Cited

U.S. PATENT DOCUMENTS

| | | | |
|---|---|---|---|
| 2004/0151952 | A1 | 8/2004 | Brady et al. |
| 2013/0050828 | A1 | 2/2013 | Sato et al. |
| 2015/0355477 | A1 | 12/2015 | Sato et al. |
| 2017/0357102 | A1 | 12/2017 | Sato et al. |
| 2018/0321507 | A1 | 11/2018 | Sato et al. |
| 2018/0364445 | A1* | 12/2018 | Osaka ..................... G02B 7/09 |
| 2019/0011664 | A1* | 1/2019 | Osaka ..................... G02B 7/09 |
| 2020/0018919 | A1* | 1/2020 | Suzuki ............... H04N 5/23287 |
| 2020/0018923 | A1* | 1/2020 | Suzuki ............... H04N 5/23287 |
| 2021/0168945 | A1* | 6/2021 | Kim ..................... H04N 5/232 |

FOREIGN PATENT DOCUMENTS

| | | |
|---|---|---|
| CN | 1826710 A | 8/2006 |
| CN | 201859718 U | 6/2011 |
| CN | 106449403 A | 2/2017 |
| CN | 107219706 A | 9/2017 |
| JP | 2016-035598 A | 3/2016 |

* cited by examiner

*Primary Examiner* — William B Perkey
(74) *Attorney, Agent, or Firm* — Oliff PLC

(57) ABSTRACT

A lens drive device includes a movable unit, a fixed unit, and a support portion. The movable unit includes a magnet and a lens holder for holding a lens. The fixed unit includes a coil board and a base board. The coil board includes a coil facing the magnet. The base board is disposed on the other side of the magnet across the coil board and includes an opening through which the optical axis of the lens passes. The support portion relatively movably connects the movable unit to the fixed unit and supports the movable unit to the fixed unit. In the fixed unit, a metal-particle-containing resin portion containing metal particles unevenly distributed in a resin covers at least one of a first conductive portion and a second conductive portion.

8 Claims, 15 Drawing Sheets

LENS DRIVE DEVICE

BACKGROUND OF THE INVENTION

The present invention relates to a lens drive device favorably used for camera module of mobile phones, for example.

In lens drive devices favorably used for camera module of mobile phones, developed are image-stabilizer lens drive devices that carry out optical image stabilization (OIS) by moving a lens holder holding a lens in orthogonal directions to an optical axis (e.g., Patent Document 1). In such lens drive devices, electric power is supplied to a drive coil for driving the lens via FPC, wirings of rigid board, springs, or the like.

A conductive connection member, such as solder, is used for a connection part between each wiring of the board, between wirings of the board and the springs, or the like. The connection member, such as solder, is melted and solidified by heating and connects the wirings. In conventional lens drive devices, however, particles are generated from the conductive connection part and may attach onto an optical path of the lens drive device and flow into an imaging element, and this is a problem. In view of prevention of excessive temperature rise of the lens drive device, it is also necessary to favorably maintain heat dissipation from the conductive connection part.

Patent Document 1: JP2016035598 (A)

BRIEF SUMMARY OF INVENTION

The present invention has been achieved under such circumstances. It is an object of the invention to provide a lens drive device that generates fewer particles and including a conductive connection part having favorable heat dissipation characteristics.

To achieve the above object, a lens drive device according to the present invention includes:

a movable unit including a magnet and a lens holder for holding a lens;

a fixed unit including:

a coil board including a coil facing the magnet and configured to drive the magnet in orthogonal directions to an optical axis of the lens; and a base board disposed on the other side of the magnet across the coil board and including an opening through which the optical axis of the lens passes; and a support portion configured to relatively movably connect the movable unit to the fixed unit and support the movable unit to the fixed unit, wherein, in the fixed unit, a metal-particle-containing resin portion containing metal particles unevenly distributed in a resin covers at least one of a first conductive portion conductively connecting a circuit of the coil board and a circuit of the base board and a second conductive portion conductively connecting one end of the support portion and the circuit of the coil board or the base board.

In the lens drive device according to the present invention, since at least one of the first conductive portion and the second conductive portion is covered with the metal-particle-containing resin portion containing metal particles unevenly distributed in a resin, the conductive portion covered with the metal-particle-containing resin portion generates fewer particles and has favorable heat dissipation characteristics.

For example, the second conductive portion may be disposed to overlap with the base board when viewed from the orthogonal directions to the optical axis.

The length for disposing this second conductive portion in the optical axis can be secured even if the length of the entire lens drive device in the optical axis is not extended, and this second conductive portion thereby contributes to low profile of the lens drive device.

For example, the metal-particle-containing resin portion may connect the coil board and the base board.

This metal-particle-containing resin portion can increase the connection strength between the coil board and the base board. Thus, the lens drive device including this metal-particle-containing resin portion has a favorable connection reliability between the coil board and the base board.

For example, the metal-particle-containing resin portion may connect a rear surface of the coil board facing the base board and a lateral surface of the base board extending in the optical axis of the lens.

The lens drive device including this metal-particle-containing resin portion can prevent the base board from being thicker in the optical axis while increasing the connection strength between the coil board and the base board and is thereby advantageous in low profile.

For example, the base board may include a coil board facing part facing the coil board and a connector part extending from the coil board facing part in the optical axis of the lens, and an entire connection part between the coil board facing part and the connector part may be positioned closer to the optical axis of the lens than to an outer circumference of the coil board when viewed from the optical axis.

This lens drive device can reduce its own area in the orthogonal directions to the optical axis and is thereby advantageous in downsizing.

For example, the base board may include a metallic plate having the opening, and the circuit of the base board may be disposed near the coil board on the plate.

This base board can be thin while securing the strength and thereby contributes to downsizing of the entire lens drive device. The metallic plate is also advantageous in enhancement of heat dissipation characteristics of the lens drive device.

For example, the metal-particle-containing resin portion may include a first metal-particle-containing resin portion covering the first conductive portion, and the first conductive portion and an opening periphery of the opening may be divided by the first metal-particle-containing resin portion.

This lens drive device can prevent the first conductive portion and other members, such as the lens holder, from colliding with each other and prevent the generation of particles from the first conductive portion. In this lens drive device, the first conductive portion is not exposed to the opening periphery, and the particles generated from the first conductive portion can thereby be prevented from flowing into the optical path. In this lens drive device, the first conductive portion is not exposed to the opening, and this lens drive device is thereby also advantageous in connection reliability between the coil board and the base board compared to prior arts including a conductive portion exposed to an opening.

For example, the metal-particle-containing resin portion may include a second metal-particle-containing resin portion covering the second conductive portion and connected to the coil board, and the base board may include a protrusion part protruding outside the outer circumference of the coil board when viewed from the optical axis of the lens and preventing the second metal-particle-containing resin portion from spreading in the orthogonal directions to the optical axis.

In this lens drive device, the shape of the second metal-particle-containing resin portion can precisely be controlled, and the second conductive portion can thereby securely be covered with the second metal-particle-containing resin portion. Moreover, this lens drive device can easily allow the second metal-particle-containing resin portion to connect the coil board and the base board.

DETAILED DESCRIPTION OF INVENTION

Hereinafter, the present invention is described based on an embodiment shown in the figures.

Figure 1:
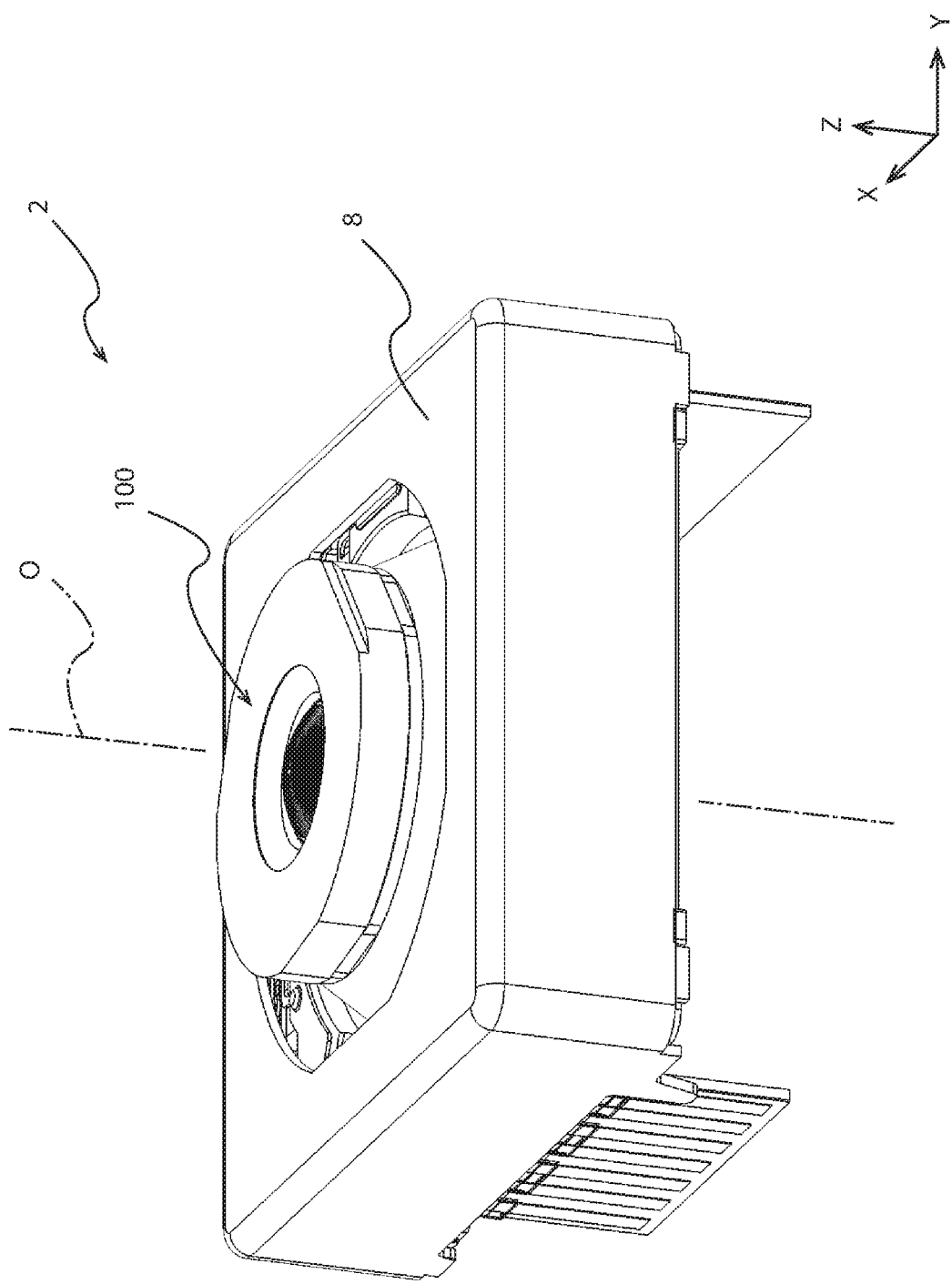
FIG. 1 is an exterior view of a lens drive device according to an embodiment of the present invention.

As shown in FIG. 1, a lens drive device 2 according to an embodiment of the present invention holds a lens 100 at a central part of the lens drive device 2 and drives the lens 100. The lens drive device 2 has a substantially rectangular outer shape when viewed from an optical axis O of the lens 100. The lens drive device 2 includes a case 8 configured to cover the inside of the lens drive device 2 from the positive size in the Z-axis direction (the incoming side in the optical axis).

The case 8 is provided with a through hole where the optical axis O of the lens 100 passes.

Figure 2:
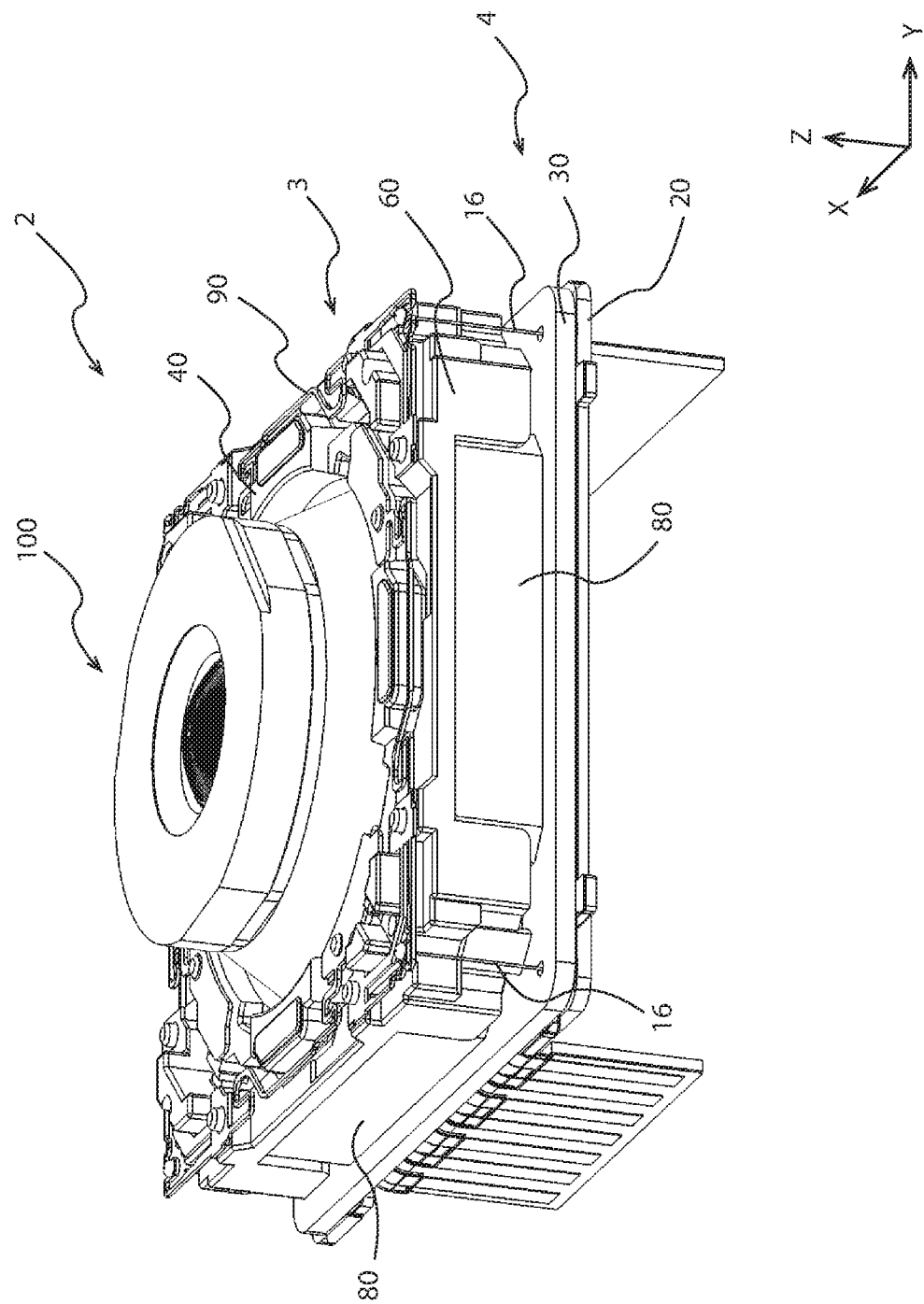
FIG. 2 is a perspective view of the lens drive device shown in FIG. 1 without a cover.

FIG. 2 is a perspective view of the lens drive device 2 shown in FIG. 1 without the case 8. The lens drive device 2 includes a movable unit 3, a fixed unit 4, and suspension wires 16. In the image stabilization, the movable unit 3 moves in orthogonal directions to the optical axis along with the lens 100 held by the lens holder 40, and the fixed unit 4 generates a relative displacement to the movable unit 3. The suspension wires 16 connect the movable unit 3 relatively movably to the fixed unit 4 and are support portions for the movable unit 3 to the fixed unit 4.

Figure 3:
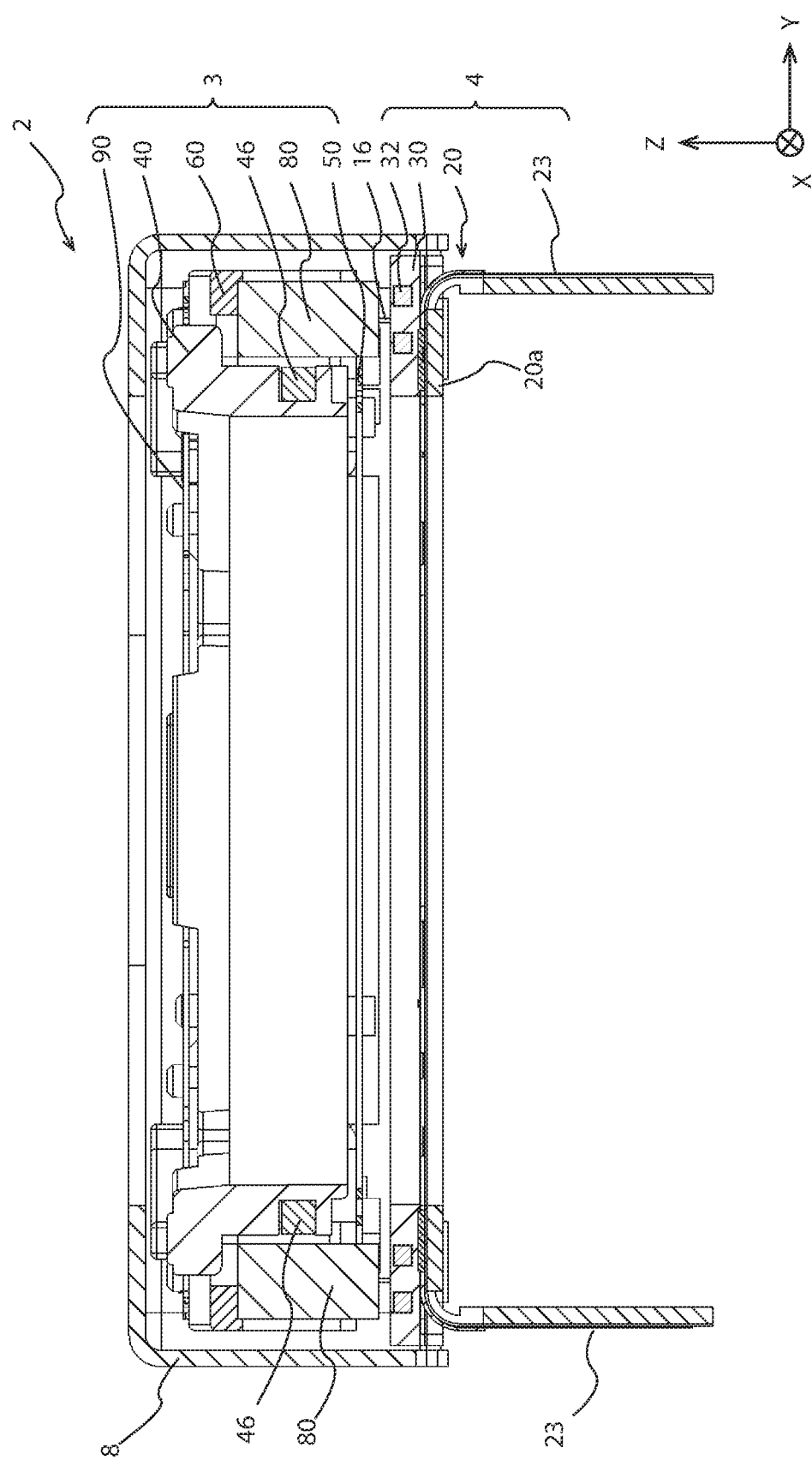
FIG. 3 is a cross-sectional view of the lens drive device shown in FIG. 1.

FIG. 3 is a cross-sectional view of the lens drive device 2 shown in FIG. 2, but does not illustrate the lens 100 for easy view of other members. As shown in FIG. 3, the movable unit 3 is disposed inside the case 8 shown in FIG. 1 and includes magnets 80 and a lens holder 40 for holding the lens 100. In addition to the lens holder 40 and the magnets 80, the movable unit 3 includes a front spring 90, a rear spring 50, a frame 60, a focus coil 46, and the like.

Figure 4:
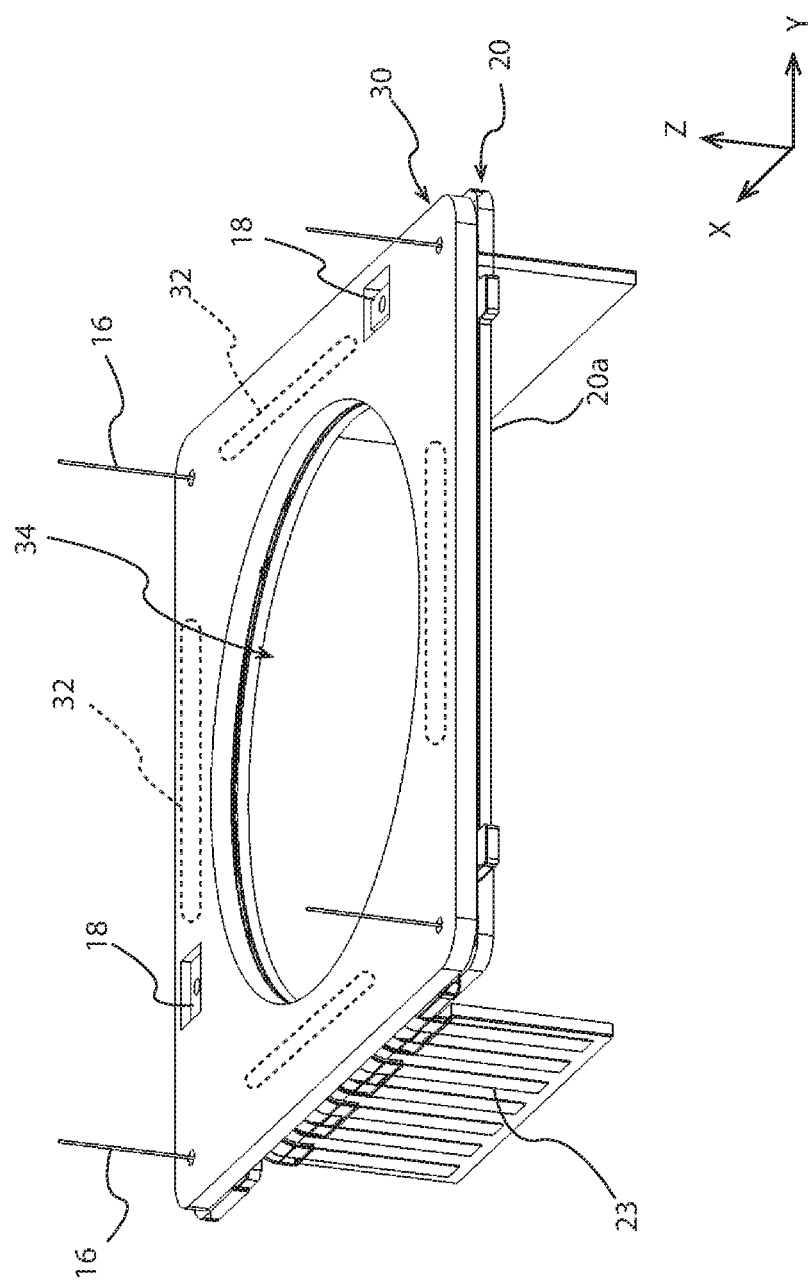
FIG. 4 is a perspective view illustrating a coil board, a base board, and their peripheral members contained in the lens drive device shown in FIG. 1.

As shown in FIG. 4, the fixed unit 4 includes a coil board 30 and a base board 20. The coil board 30 includes image-stabilizer coils 32 (see FIG. 4) for driving the magnets 80 of the movable unit 3 in orthogonal directions to the optical axis of the lens 100. The base board 20 includes base wirings 21 (see FIG. 6) configured to be electrically connected to a circuit of the coil board 30. Connector parts 23 (a part of the base board 20) are exposed from the case 8 to the negative side in the Z-axis direction (the outgoing side in the optical axis).

The lens drive device 2 is used by being combined with an image sensor (not illustrated), such as a solid-state imaging sensor. The image sensor is disposed in the back of the lens holder 40 (the negative side in the Z-axis direction) and photoelectrically converts an emitted light from the lens 100 held by the lens drive device 2 into an image. The image sensor is disposed in any manner. The image sensor may directly be fixed to the fixed unit 4 of the lens drive device 2 or may be connected to the lens drive device 2 via other members.

In the description of the lens drive device 2, the Z-axis is a parallel direction to the optical axis O of the lens 100 shown in FIG. 1, and the X-axis and the Y-axis are orthogonal directions to the optical axis O.

As shown in FIG. 2 and FIG. 3, the movable unit 3 of the lens drive device 2 is supported to the fixed unit 4 by four suspension wires 16 extending in the optical axis. As shown in FIG. 2, the suspension wires 16 are arranged at four corners of the substantially rectangular lens drive device 2, and four corners of the movable unit 3 and four corners of the fixed unit 4 are connected to each other. The suspension wires 16 are made of an elastic material, such as metal, and at least two suspension wires 16 also function as an electricity supply passage to the focus coil 46 fixed to the lens holder 40. The other suspension wires 16 may also function as an electricity supply passage to a position sensor or so (not illustrated) disposed on the movable unit 3.

Incidentally, a support portion for relatively movably connecting the movable unit 3 to the fixed unit 4 is not limited to the suspension wires 16 shown in FIG. 2, but may be another mechanism that relatively movably supports the movable unit 3 in orthogonal directions to the optical axis, such as a rolling ball and a slide mechanism.

As shown in FIG. 2, the ends of the suspension wires 16 on the positive side in the Z-axis direction are fixed to an outer portion of the front spring 90. The front spring 90 includes the outer portion fixable to the frame 60, an inner portion fixable to the lens holder 40, and an arm portion that connects the outer portion and the inner portion. The front spring 90 is divided into multiple pieces and also functions as an electricity supply passage to the focus coil 46 similarly to some of the suspension wires 16.

As shown in FIG. 3, the movable unit 3 includes the frame 60, the magnets 80 fixable to the frame 60, the lens holder 40 relatively movably held to the frame 60 and the magnets 80 in the optical axis, and the focus coil 46 fixable to the lens holder 40. The lens holder 40 and the frame 60 are connected by two springs (the front spring 90 attachable on the positive side in the Z-axis direction and the rear spring 50 attachable on the negative side in the Z-axis direction). As is the case with the front spring 90, the rear spring 50 also includes an inner portion fixable to the lens holder 40 and an arm portion that connects an outer portion and the inner portion.

As shown in FIG. 2 and FIG. 3, the lens holder 40 has a hollow cylindrical shape, and the lens 100 is fixed to an inner circumferential surface of the lens holder 40. As shown in FIG. 3, the ring-shaped focus coil 46 is fixed to an outer circumferential surface of the lens holder 40 and surrounds it. The focus coil 46 faces the inner surfaces of the magnets 80.

As shown in FIG. 2, the frame 60 fixable to the outer portion of the front spring 90 has a substantially rectangular frame shape. The magnet 80 is fixed to each side of the frame 60, and the lens drive device 2 includes four magnets 80. The magnets 80 have a substantially cuboid outer shape and are arranged to surround the lens holder 40.

As shown in FIG. 3, the magnets 80 and the focus coil 46 facing the magnets 80 with a predetermined distance in orthogonal directions to the optical axis form a voice coil motor that drives the lens 100 held by the lens holder 40 in the optical axis.

FIG. 4 is a perspective view illustrating the coil board 30, the base board 20, and their peripheral members contained in the lens drive device 2. As shown in FIG. 4, the coil board 30 is provided with a coil board opening 34 (the optical axis O passes through the central part) and has a substantially rectangular plate outer shape orthogonal to the optical axis O. One ends 16a (see FIG. 14), which are the ends of the suspension wires 16 on the negative side in the Z-axis direction, are fixed to the four corners of the coil board 30.

The coil board 30 includes the image-stabilizer coils 32 (coils for image-stabilization drive). As shown in FIG. 4, the coil board 30 includes four image-stabilizer coils 32 arranged to surround the coil board opening 34 in the four sides of the coil board 30.

As shown in FIG. 3, the image-stabilizer coils 32 face the magnets 80 of the movable unit 3 with a predetermined distance in the optical axis and drive the magnets 80 in orthogonal directions to the optical axis of the lens 100. Thus, the image-stabilizer coils 32 and the magnets 80 form a voice coil motor that drives the lens 100 held by the lens holder 40 in orthogonal directions to the optical axis.

Figure 10:
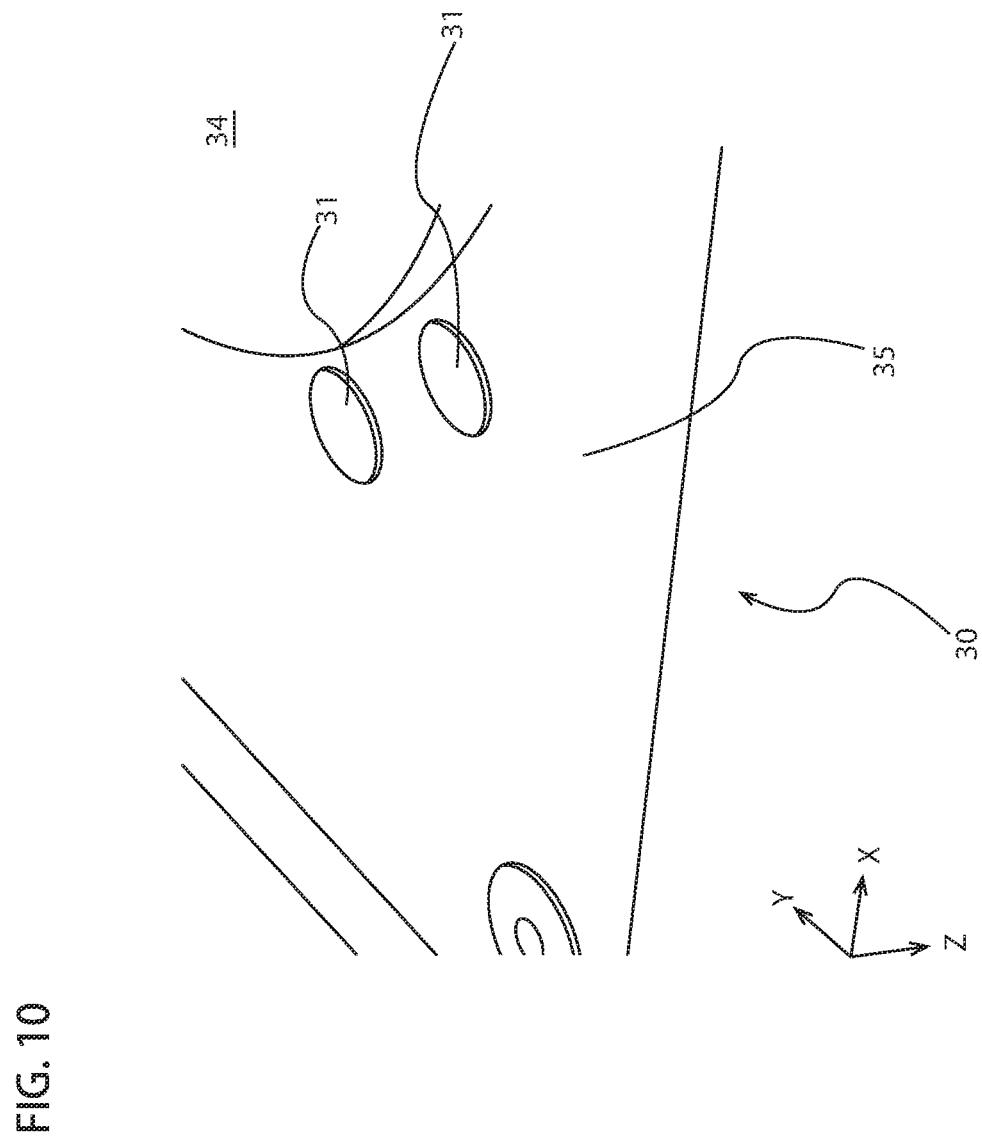
FIG. 10 is a partial perspective view illustrating a coil board before a first conductive portion is formed.
Figure 14:
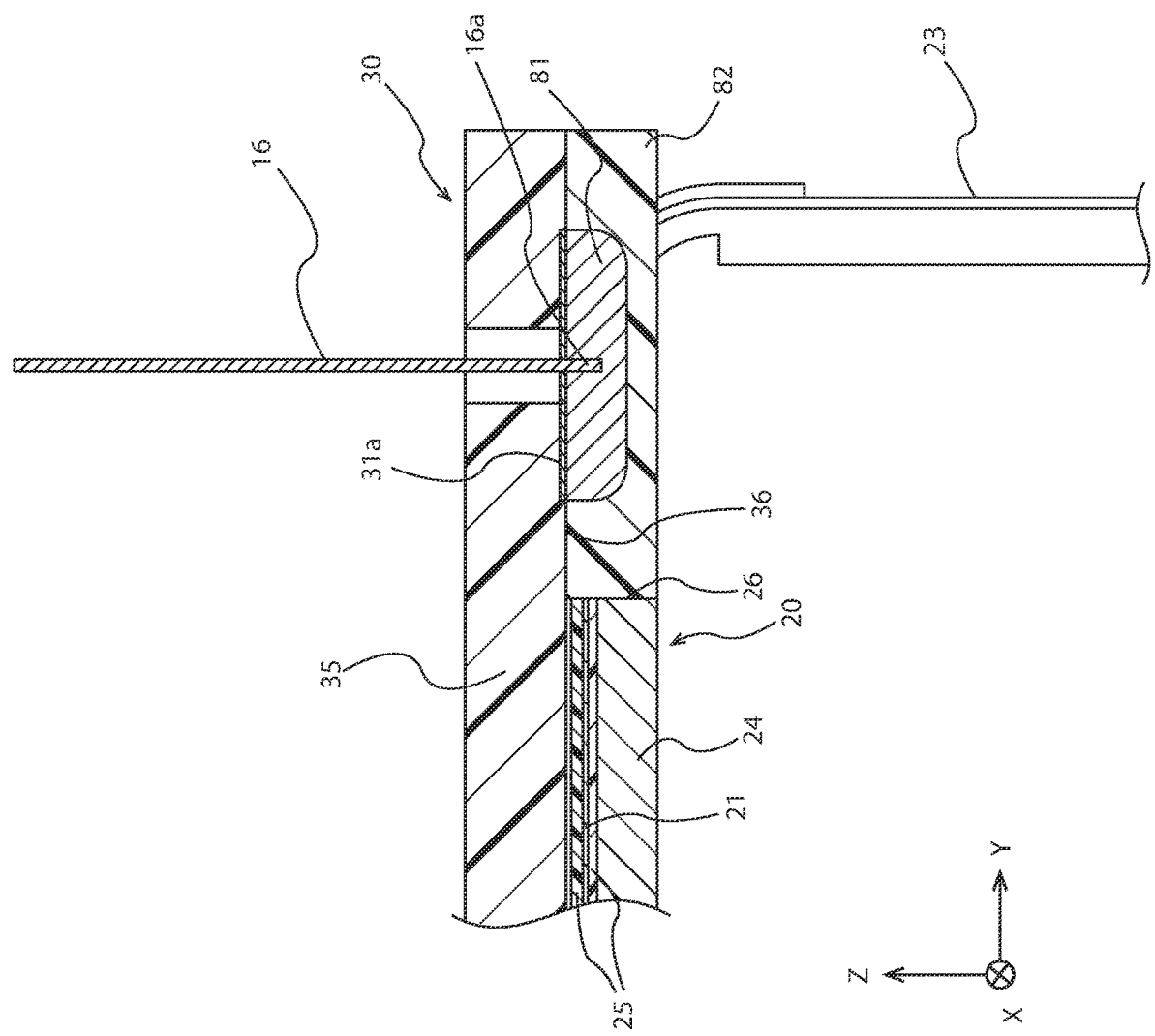
FIG. 14 is an enlarged cross-sectional view illustrating a periphery of a second conductive portion contained in the lens drive device shown in FIG. 1.

Coil wirings 31 (circuits owned by the coil board 30) includes a circuit connected to the image-stabilizer coils 32 and a circuit electrically connected to the one ends 16a of the suspension wires 16. As shown in FIG. 8, FIG. 10, and FIG. 14, the coil wirings 31 are partially exposed to the surface of the coil board 30 on the negative side in the Z-axis direction, and the exposed portion is connected to a first conductive portion 71 or a second conductive portion 81 mentioned below. The image-stabilizer coils 32 and the coil wirings 31 are made of a good metallic conductor. As shown in FIG. 4, the surfaces of the image-stabilizer coils 32 and the coil wirings 31 are covered with a coil board insulation portion (insulator) 35 (see FIG. 10) except for a part to be connected with the first conductive portions 71 and the second conductive portions 81.

As shown in FIG. 4, the coil board 30 is provided with through holes for insertion of position sensors 18, each of which detects a position of the magnet 80, and the position sensors 18 fixed to the base board 20 face the magnets 80 via the through holes. Incidentally, the circuits owned by the coil board 30 include the coil wiring 31 connected to the image-stabilizer coils 32 and the coil wiring 31 electrically connected to one ends of the suspension wires 16. As with the coil wiring 31 connected to the image-stabilizer coils 32, one end of the coil wiring 31 connected to the suspension wires 16 is also exposed to the surface of the coil board 30 on the negative side in the Z-axis direction, and the first conductive portion 71 is connected to the exposed portion. As with one ends of the coil wirings 31, the other ends 31a of the coil wirings 31 are exposed to the surface of the coil board 30 on the negative side in the Z-axis direction, and the suspension wires 16 are connected to the other ends 31a (exposed portions) by the second conductive portions 81 (see FIG. 14).

Figure 5:
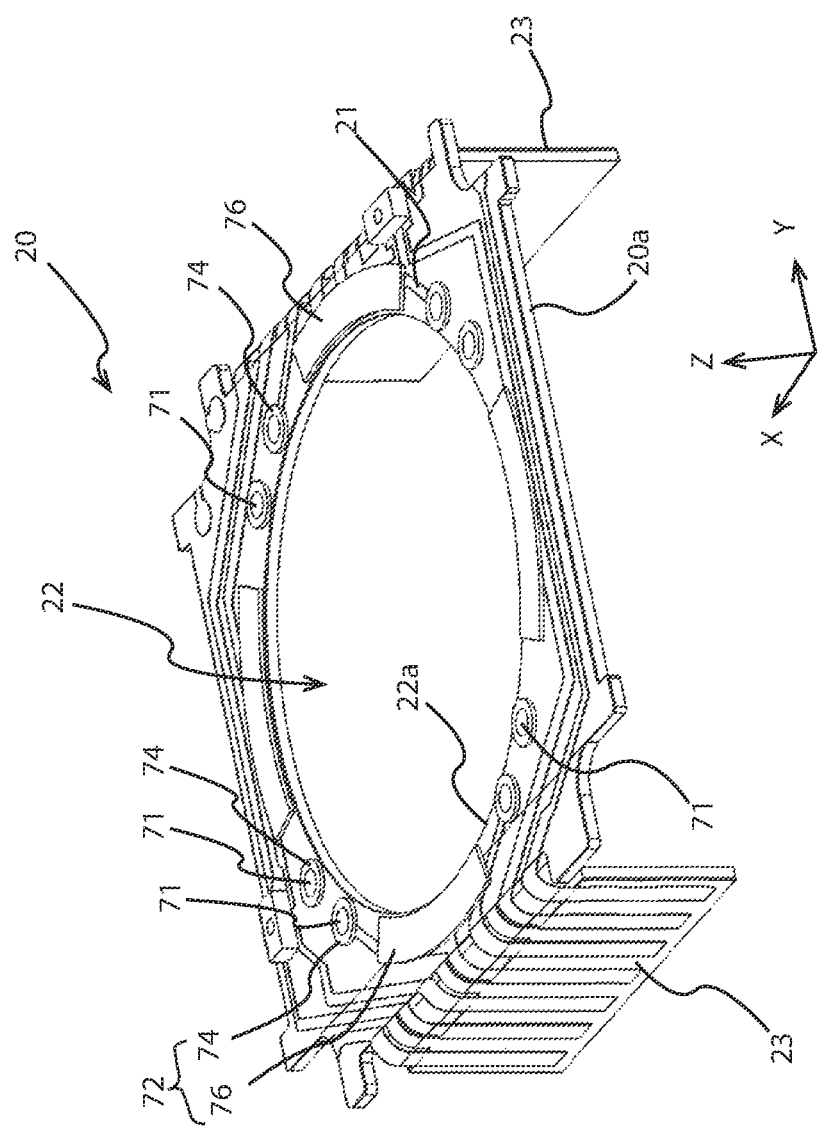
FIG. 5 is a perspective view illustrating a base board and its peripheral members contained in the lens drive device shown in FIG. 1.

As shown in FIG. 3 and FIG. 4, the base board 20 is disposed to the coil board 30 on the negative side in the Z-axis direction opposite to the positive side in the Z-axis direction (the coil board 30 faces the magnets 80). As shown in FIG. 5 (a perspective view of the base board 20), the base board 20 is provided with the base opening 22 (an opening where the optical axis O passes through the central part) and includes a coil board facing part 20a and a pair of connector parts 23. The coil board facing part 20a has a substantially rectangular plate outer shape orthogonal to the optical axis O. The pair of connector parts 23 is connected to both sides of the coil board facing part 20a in the Y-axis direction and extends in the optical axis.

As shown in FIG. 3 and FIG. 4, the base opening 22 of the base board 20 is disposed to substantially correspond to the coil board opening 34 of the boil board 30 when viewed from the Z-axis direction. As shown in FIG. 5, the pair of connector parts 23 is foldable to the coil board facing part 20a. The connector parts 23 are connectable to an external board that transmits electric power and control signal for driving the lens drive device 2 to the lens drive device 2.

Figure 6:
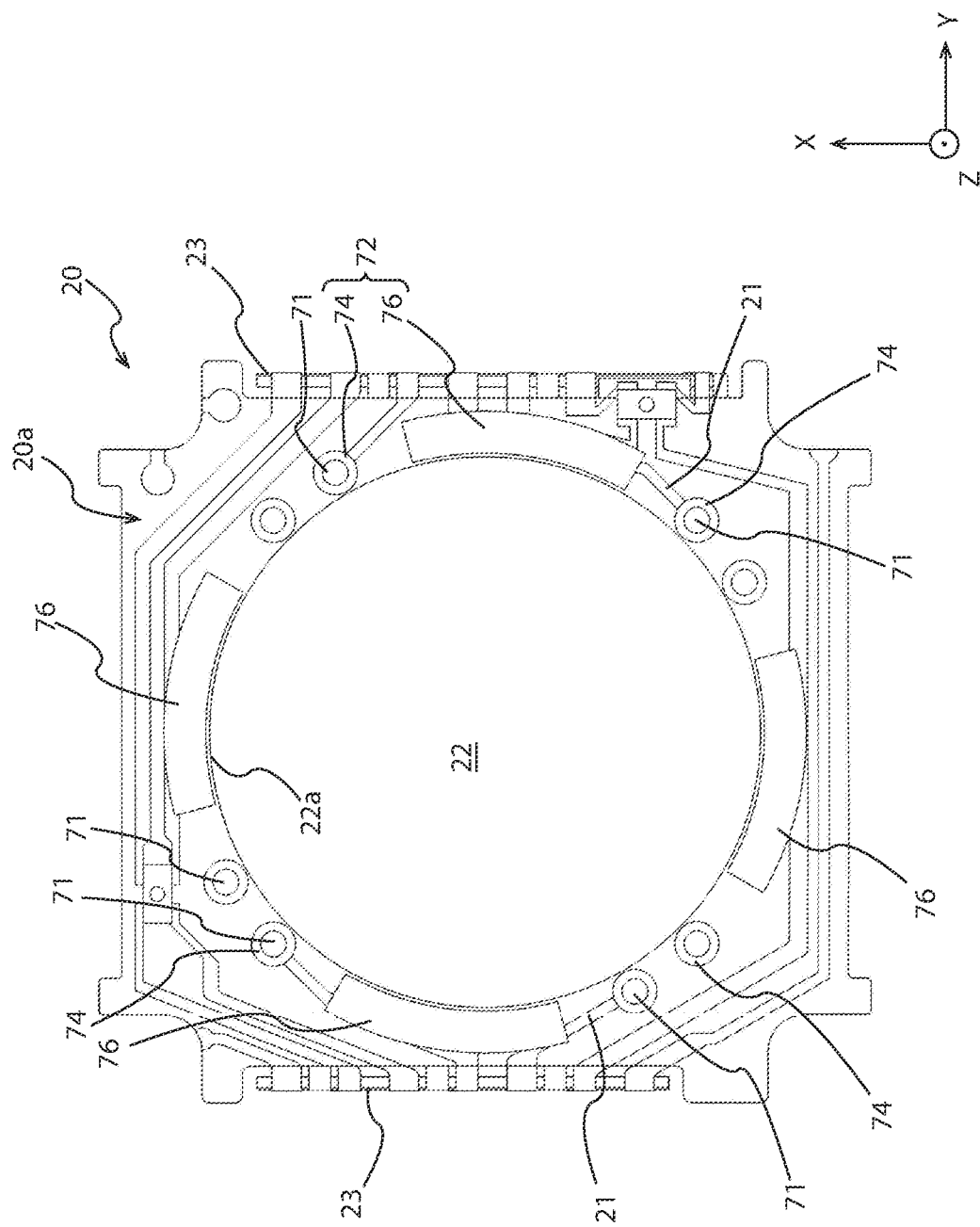
FIG. 6 is a plane view illustrating a base board and its peripheral members contained in the lens drive device shown in FIG. 1.

FIG. 6 is a plane view illustrating the base board 20 and its peripheral members. As shown in FIG. 5 and FIG. 6, the base board 20 includes a plurality of base wirings 21. The base wirings 21 are made of a metallic good conductor and form a conductive passage continuing from one end connected with the first conductive portion 71 in the coil board facing part 20a to the other end exposed at the connector part 23.

Figure 8A:
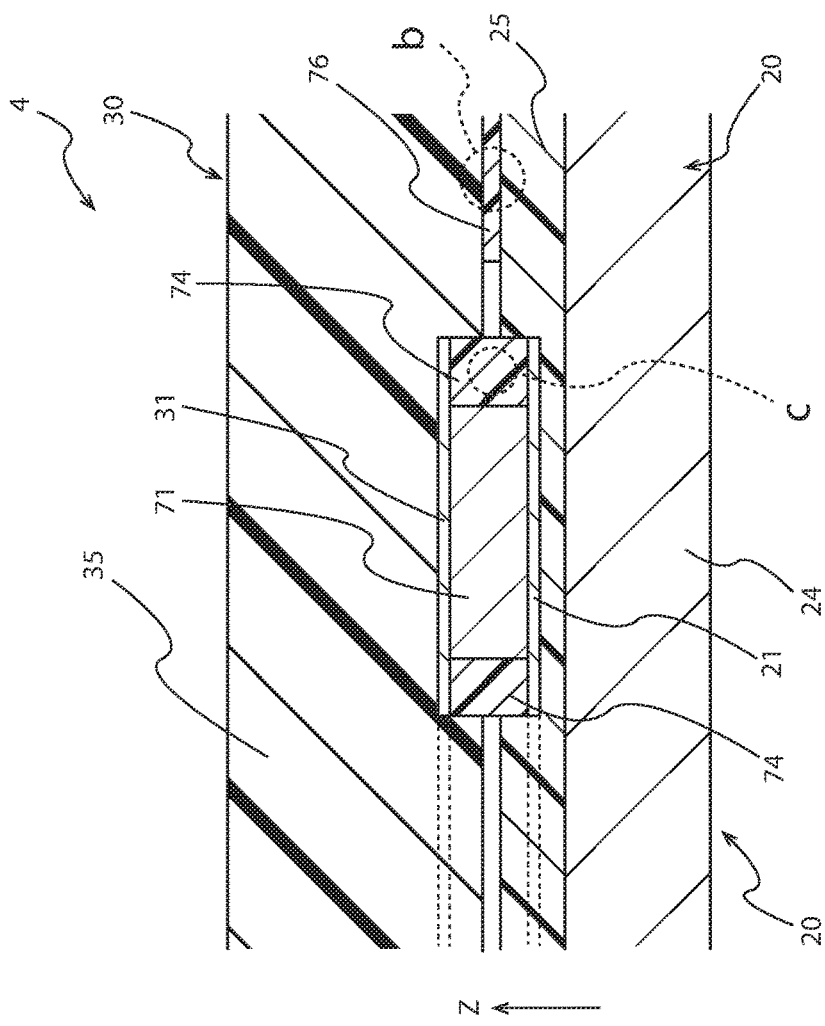
FIG. 8A is a partially enlarged view illustrating a vicinity of a first conductive portion contained in the lens drive device shown in FIG. 1.
Figure 9:
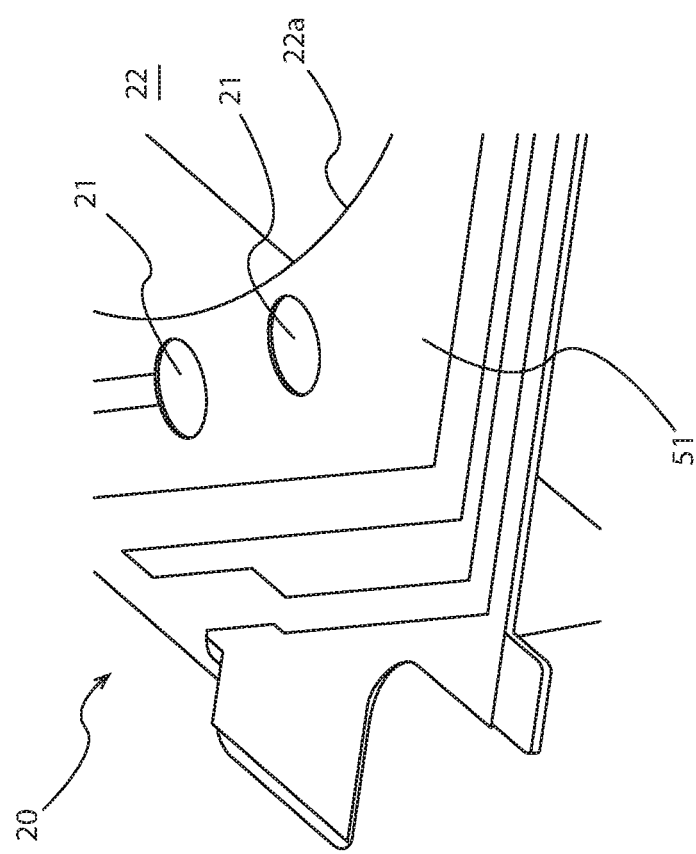
FIG. 9 is a partial perspective view illustrating a base board before a first conductive portion is formed.

As shown in FIG. 9, the base wirings 21 are partially exposed to the surface of the coil board facing part 20a of the base board 20 on the positive side in the Z-axis direction, and the first conductive portions 71 (see FIG. 6) are connected to the exposed portions. Incidentally, FIG. 5, FIG. 6, FIG. 7, FIG. 9, and FIG. 13 illustrate the base wirings 21 by transparentizing a base insulation portion (insulator) 25 (see FIG. 8A) for recognition of arrangement of the base wirings 21 located below the insulator, but the base wirings 21 are actually covered with the base insulation portion 25 except for one end connected to the first conductive portion 71 and the other end exposed at the connector part 23.

Figure 8B:
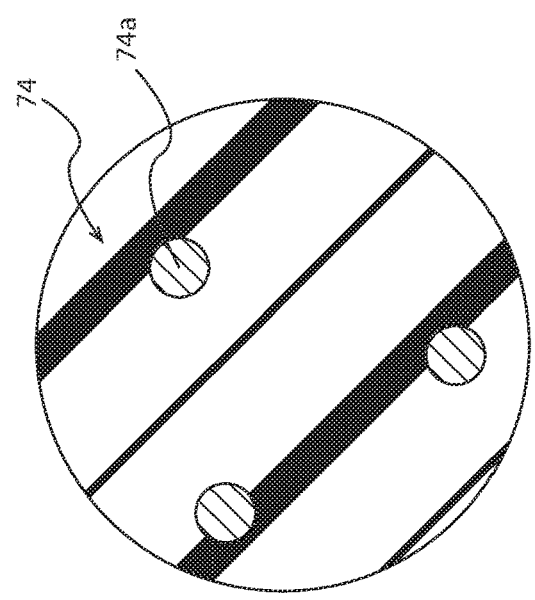
FIG. 8B is a conceptual view of a third resin portion shown in FIG. 8A.

As shown in FIG. 5 and FIG. 6, the first conductive portions 71 and resin portions 72 are arranged on the surface of the coil board facing part 20a of the base board 20 on the positive side in the Z-axis direction. As shown in FIG. 8A (a cross-sectional view of the fixed unit 4 in the vicinity of the first conductive portion 71), the first conductive portion 71 conductively connects the coil wiring 31 disposed on the positive side of the first conductive portion 71 in the Z-axis direction and the base wiring 21 disposed on the negative side of the first conductive portion 71 in the Z-axis direction.

As shown in FIG. 8A, the first conductive portion 71 is made of a conductive material, such as solder and conductive adhesive, but may be made of any material that conducts the coil wiring 31 and the base wiring 21. Incidentally, as shown in FIG. 8A, the base board 20 contains a metal plate 24 having the base opening 22 shown in FIG. 6. As shown in FIG. 8A, the base wiring 21 is disposed near the coil board 30 on the plate 24 via the base insulation portion 25, and the plate 24 with conductivity is insulated by the base insulation portion 25.

Figure 7:
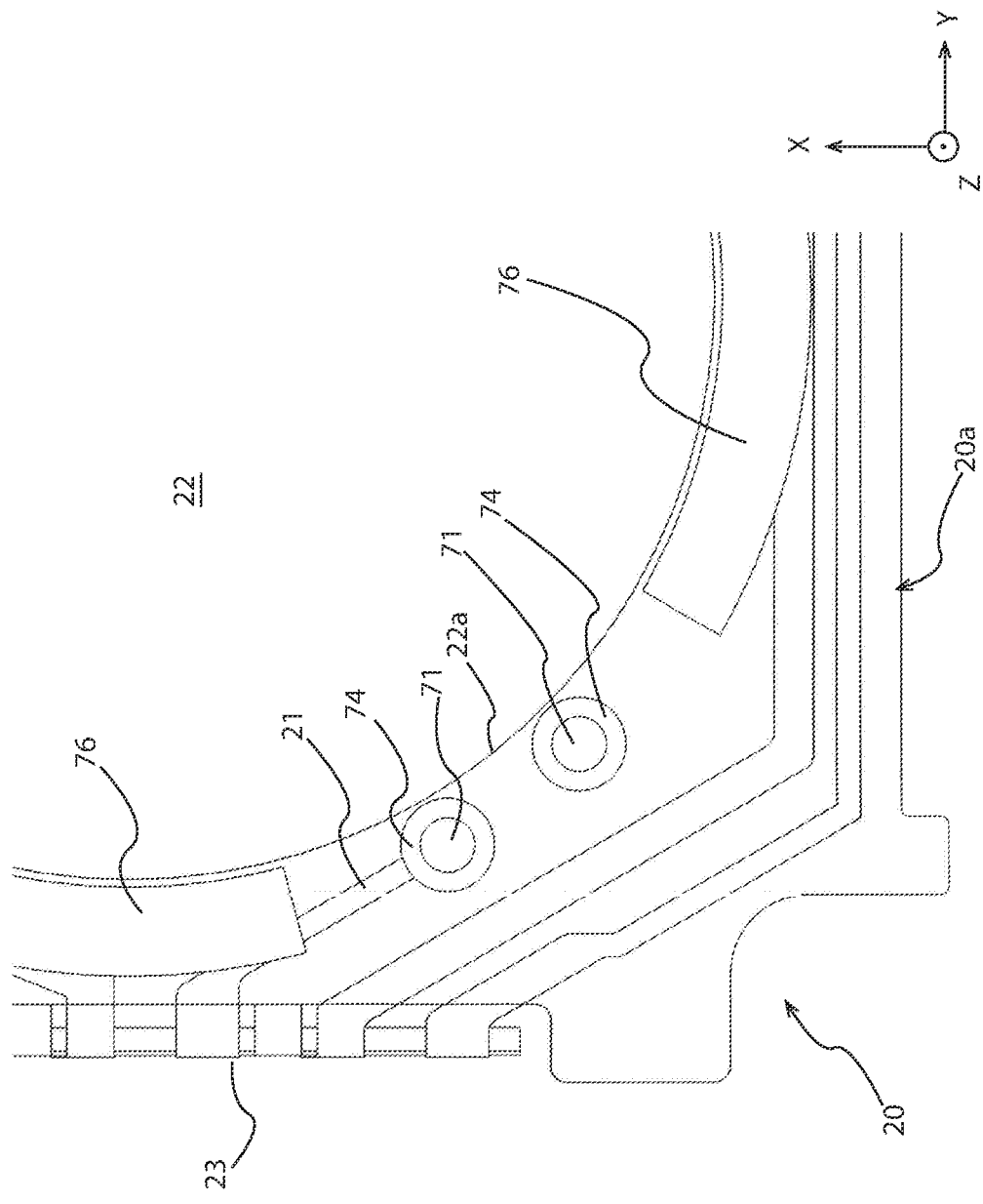
FIG. 7 is a partially enlarged view of the base board and its peripheral members shown in FIG. 6.

As shown in FIG. 7 (a partially enlarged view of FIG. 6), the first conductive portions 71 are disposed away from an opening periphery 22a of the base opening 22 to the outside of the base opening 22 in the radial direction and are not exposed to the base opening 22. Moreover, the first conductive portions 71 and the opening periphery 22a are divided by a first metal-particle-containing resin portion 74. In the fixed unit 4, only some of the first conductive portions 71 may be away from the opening periphery 22a of the base opening 22, but as shown in FIG. 6, all of the first conductive portions 71 are preferably away from the opening periphery 22a of the base opening 22 in view of more effectively preventing particles from flowing into the base opening 22.

As shown in FIG. 6, each of the resin portions 72 includes the first metal-particle-containing resin portion 74 surrounding the first conductive portion 71 when viewed from the optical axis and a second resin portion 76 disposed away from the first metal-particle-containing resin portion 74. A plurality of resin portions 72 including the first metal-particle-containing resin portion 74 and the third resin portion 76 is arranged intermittently around the base opening 22.

As shown in FIG. 8A, the first metal-particle-containing resin portion 74 connects the coil board 30 and the base board 20 in the Z-axis direction. A part of the first metal-particle-containing resin portion 74 enters a step between the exposed surface of the coil wiring 31 and the insulation surface of the coil board 30, and another part of the first metal-particle-containing resin portion 74 enters a step between the exposed surface of the base wiring 21 and the surface of the base insulation portion 25.

As shown in FIG. 8A, the exposed parts of the first conductive portion 71 and the coil wiring 31 and the base wiring 21 connected to the first conductive portion 71 are covered with the first metal-particle-containing resin portion 74 and the insulators of the boards 20 and 30 and are thereby not exposed. Since the first metal-particle-containing resin portion 74 covers and protects the first conductive portion 71 and the like, the generation of particles from the connection portion of the first conductive portion 71 is prevented, and dust and water can be prevented from attaching to the conductive portion.

Figure 8C:
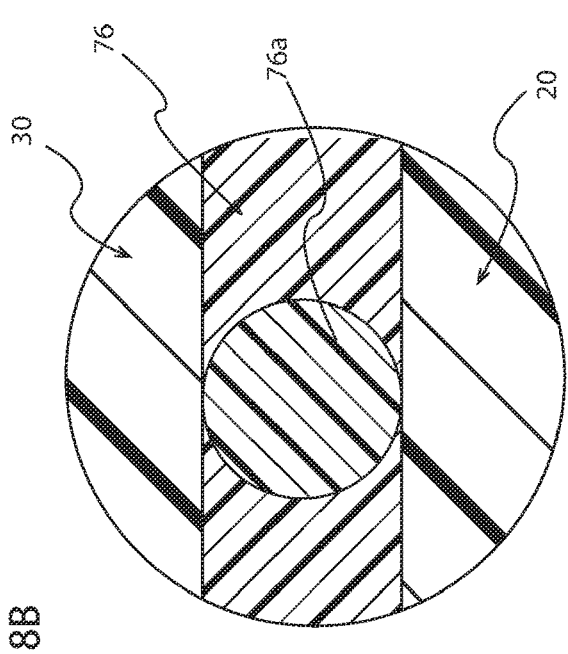
FIG. 8C is a conceptual view of a first metal-particle-containing resin portion shown in FIG. 8A.

The entire part of the first metal-particle-containing resin portion 74 has insulation property and is mainly made of a resin, but as shown in FIG. 8C, the first metal-particle-containing resin portion 74 contains metal particles 74a unevenly distributed in the resin. The first metal-particle-containing resin portion 74 containing the metal particles 74a have good heat dissipation characteristics. The metal particles 74a contained in the first resin portion 74 are not limited and may be, for example, a conductive material similar to that contained in the first conductive portion 71.

As shown in FIG. 6, the third resin portion 76 is formed into an arc shape along the opening periphery 22a. As shown in FIG. 8A, the third resin portion 76 connects the insulation surface of the coil board 30 and the surface of the base insulation portion 25. The third resin portion 76 is formed by a resin where an adhesive is hardened, but does not need to contain the metal particles 74a contained in the first metal-particle-containing resin portion 74.

As shown in FIG. 8B, the third resin portion 76 contains a spacer 76a defining a space between the coil board 30 and the base board 20. The spacer 76a is sandwiched by the coil board 30 and the base board 20 and thereby prevents the space between the coil board 30 and the base board 20 from being smaller than a particle size of the spacer 76a. The spacer 76a can be disposed between the coil board 30 and the base board 20 by, for example, being dispersed into an adhesive to be a material of the third resin portion 76. The spacer 76a has any particle size. For example, the spacer 76a can have a particle size that is larger than a particle size of the metal particles 74a contained in the first metal-particle-containing resin portion 74.

As shown in FIG. 7, the first metal-particle-containing resin portions 74 and the third resin portions 76 are arranged away from the opening periphery 22a to the outside in the radial direction and are not exposed to the base opening 22. In view of preventing particles from flowing into the base opening 22, the first metal-particle-containing resin portions 74 and the third resin portions 76 are also preferably arranged to avoid the opening periphery 22a. When a resin that generates fewer particles is employed for a material of the first metal-particle-containing resin portions 74 and the third resin portions 76, however, the resin portions 72 may be exposed to the base opening 22.

Figure 13:
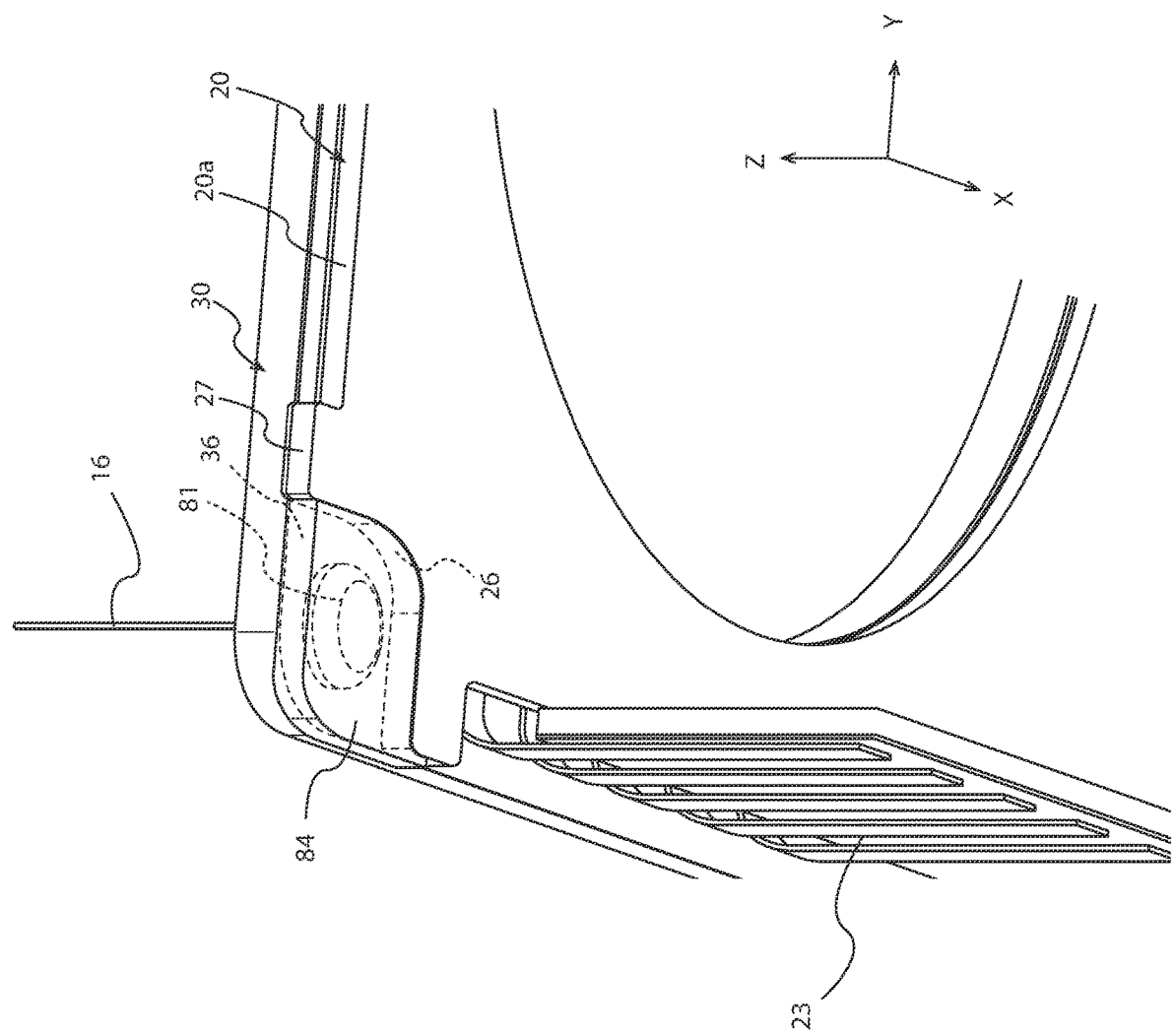
FIG. 13 is a partial perspective view illustrating the coil board, the base board, and their peripheral members shown in FIG. 4 when viewed from the outgoing side in the optical axis.

FIG. 13 is a perspective view of a connection part between the suspension wire 16 and the coil board 30 viewed from the negative side in the Z-axis direction (the outgoing side in the optical axis). As shown in FIG. 13, the second conductive portion 81 connecting the suspension wire 16 (support portion) and a circuit of the coil board 30 is covered with a second metal-particle-containing resin portion 84.

As shown in FIG. 14 (a cross-sectional view including the second conductive portion 81 and the second metal-particle-containing resin portion 84), the second conductive portion 81 conductively connects the one end 16a of the suspension wire 16, which also functions as a conductive passage, and the coil wiring 31 (a circuit of the coil board 30). The suspension wire 16 is inserted through the other end 31a (an exposed portion of the coil wiring 31) in the optical axis, and the one end 16a of the suspension wire 16 protrudes from the other end 31a toward the negative side in the Z-axis direction.

The second conductive portion 81 is disposed to cover the surface of the other end 31a of the coil wiring 31 on the negative side in the Z-axis direction and the one end 16a of the suspension wire 16 protruding from the other end 31a. The second conductive portion 81 is connected to both of the suspension wire 16 and the coil wiring 31 and connects both of them. Moreover, the second conductive portion 81 fixes the one end 16a and the other end 31a so that the one end 16a of the suspension wire 16 does not fall off from the coil wiring 31.

As shown in FIG. 14, the second conductive portion 81 is made of a conductive material, such as solder and conductive adhesive, as with the first conductive portion 71, but the second conductive portion 81 may be made of any material that conducts the suspension wire 16 and the coil wiring 31.

As shown in FIG. 13 and FIG. 14, the second conductive portion 81 is disposed to overlap with the base board 20 when viewed from orthogonal directions of the optical axis. As shown in FIG. 14, the end of the second conductive portion 81 on the negative side in the Z-axis direction is positioned closer to the positive side in the Z-axis direction than to the surface of the base board 20 on the negative side in the Z-axis direction. When the second conductive portion 81 is disposed in such a manner, the lens drive device can be thinner.

As shown in FIG. 13 and FIG. 14, the outer surface of the second conductive portion 81 is covered with the second metal-particle-containing resin portion 84 and is not exposed. Since the second metal-particle-containing resin portion 84 covers and protects the second conductive portion 81 and the like, the generation of particles from the connection portion of the second conductive portion 81 is prevented, and dust and water can be prevented from attaching to the conductive portion.

The entire part of the second metal-particle-containing resin portion 84 has insulation property and is mainly made of a resin. As with the first metal-particle-containing resin portions 74 shown in FIG. 8C, the second metal-particle-containing resin portion 84 contains metal particles unevenly distributed in the resin. The second metal-particle-containing resin portion 84 containing the metal particles have good heat dissipation characteristics. The metal particles contained in the second metal-particle-containing resin portion 84 are not limited and may be, for example, a conductive material similar to that contained in the second conductive portion 81.

As shown in FIG. 13 and FIG. 14, the second metal-particle-containing resin portion 84 connects the coil board 30 and the base board 20. In particular, the second metal-particle-containing resin portion 84 connects a rear surface 36 (a surface of the coil board 30 facing the base board 20 (the negative side in the Z-axis direction)) and a lateral surface 26 (a surface of the base board 20 extending in the optical axis). The second metal-particle-containing resin portion 84 can prevent the lens drive device 2 from being long in the optical axis while increasing a connection strength between the coil board 30 and the base board 20. Thus, the lens drive device 2 is advantageous in low profile.

As shown in FIG. 13, the base board 20 includes protrusion parts 27. The protrusion parts 27 protrude outward from the outer circumference of the coil board 30 when viewed from the optical axis and prevent the second metal-particle-containing resin portion 84 from spreading in orthogonal directions to the optical axis. For example, the protrusion parts 27 can be formed by applying a movable fluid or paste raw material using a dispenser or so and thereafter solidifying it. The protrusion parts 27 can prevent the raw material from spreading on the rear surface 36 before the second metal-particle-containing resin portion 84 is solidified. Thus, the protrusion parts 27 can thereby precisely control the shape of the second metal-particle-containing resin portion 84.

In the base board 20, as shown in FIG. 13 and FIG. 14, the entire connection portion between the coil board facing part 20a and the connector part 23 is positioned closer to the optical axis than to the outer circumference of the coil board 30 when viewed from the optical axis. Thus, as shown in FIG. 3, the connector parts 23 are arranged to hide behind the coil board 30 when viewed from the incoming side in the optical axis (from the positive side in the Z-axis direction).

Thus, the lens drive device 2 can reduce an area in orthogonal directions to the optical axis.

As described above, since at least one of the first conductive portion 71 and the second conductive portion 81 is covered with the first metal-particle-containing resin portion 74 or the second metal-particle-containing resin portion 84 (a metal-particle-containing resin portion containing metal particles unevenly distributed in a resin), the conductive portion 71 (81) covered with the metal-particle-containing resin portion 74 (84) generates fewer particles and has good heat dissipation characteristics.

Incidentally, in view of heat dissipation characteristics, also employed can be a structure where either of the first conductive portion 71 and the second conductive portion 81 is covered with the metal-particle-containing resin portion 74 (84), and the other is not covered with the resin and exposed or is covered with a resin failing to contain metal particles. In view of not only preventing generation of particles and securing heat dissipation characteristics but also simultaneously preventing dust and water from attaching to the conductive portions, however, both of the first conductive portion 71 and the second conductive portion 81 are preferably covered with the metal-particle-containing resin portion 74 (84) containing metal particles unevenly distributed in a resin.

In the lens drive device 2, as mentioned above, the first conductive portions 71 connecting the coil wiring 31 and the base wiring 21 as shown in FIG. 8A are arranged away from the opening periphery 22a of the base opening 22 to the outside in the radial direction as shown in FIG. 7. Thus, the first conductive portions 71 and other members (e.g., the lens holder 40) are prevented from colliding with each other, and the generation of particles from the first conductive portions 71 can be prevented.

Since the first conductive portions 71 are not exposed to the opening periphery 22a, particles generated from the first conductive portions 71 can be prevented from flowing into the optical passage. Moreover, the first conductive portions 71 are not exposed to the opening and are thereby less subject to receive impacts or so. Thus, the lens drive device 2 is also advantageous in connection reliability compared to prior arts where a conductive portion is exposed to an opening. Moreover, when the base board 20 includes the metallic plate 24, the lens drive device 2 can appropriately secure the insulation between the first conductive portions 71 and the plate 24 by separating the first conductive portions 71 from the opening periphery 22a and arranging the resin portions 72.

Hereinbefore, the lens drive device 2 according to the present invention is described based on an embodiment, but the present invention is not limited to only the above-mentioned embodiment and, needless to say, includes many other embodiments and variations. In the above-mentioned embodiment, for example, the plate 24 of the base board 20 is made of metal and can thereby have a favorably secured strength even if it is thin, and the lens drive device 2 has favorable heat dissipation characteristics as the heat generated in the coil and the wirings is discharged via the plate 24. However, the base board of the present invention is not limited to a base board having the metallic plate 24 and may be a base board having a plate made of resin or other materials.

Figure 11:
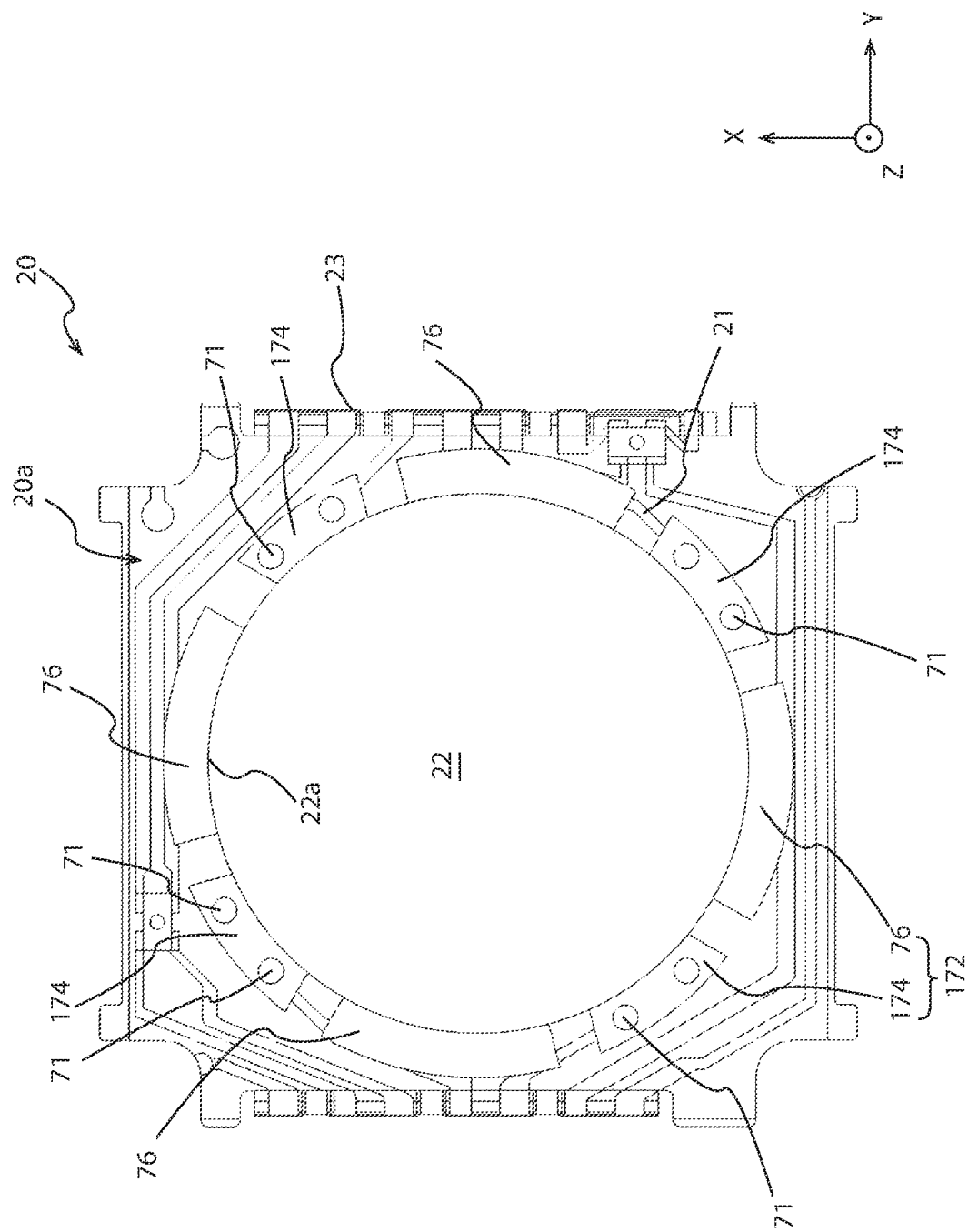
FIG. 11 is a plane view illustrating a base board and its peripheral members according to First Variation.

The arrangement of the resin portions 72 is not limited to the one shown in FIG. 6, and the first metal-particle-containing resin portions 74 and the third resin portions 76 may have a different shape from the shape shown in the embodiment. FIG. 11 is a plane view illustrating the base board 20 and its peripheral members of a lens drive device with resin portions 172 according to First Variation. In the resin portions 172 according to First Variation, as with the third resin portions 76, first metal-particle-containing resin portions 174 are formed into an arc shape along the opening periphery 22a.

Each of the first metal-particle-containing resin portions 174 connects a plurality (two in the example of FIG. 11) of first conductive portions 71 and covers the periphery of the first conductive portions 71. Since each of the first metal-particle-containing resin portions 174 is formed broadly around the first conductive portions 71, the generation of particles from the first conductive portions 71 is effectively prevented, and the first metal-particle-containing resin portions 174 can effectively protect the first conductive portions 71. Moreover, the first metal-particle-containing resin portions 174 have a favorable reinforcement effect on the connection of the boil board 30 and the base board 20. Except for the shape of the first metal-particle-containing resin portions 174, the lens drive device according to First Variation is similar to the lens drive device 2 according to the embodiment and demonstrates similar effects thereto.

Figure 12:
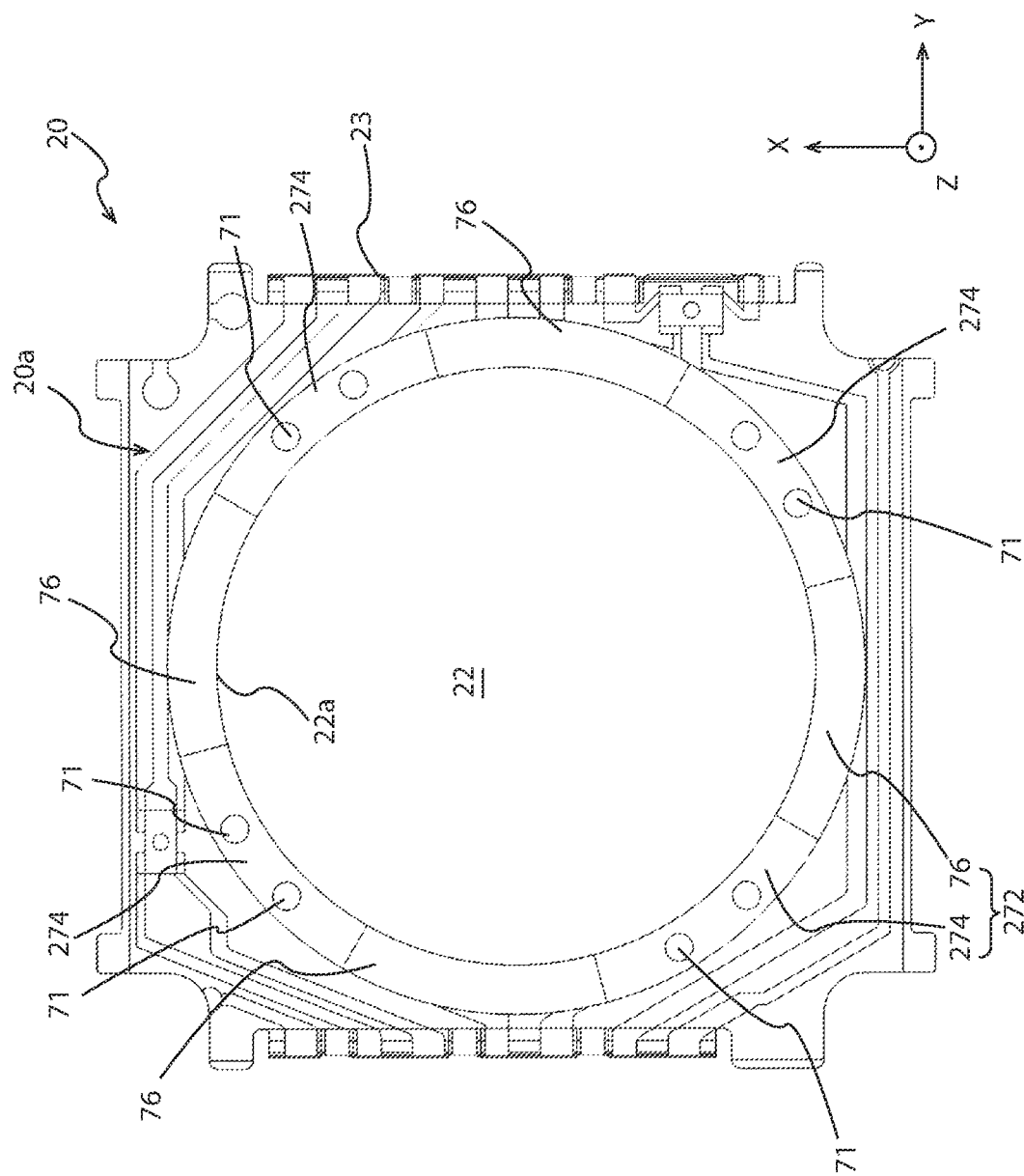
FIG. 12 is a plane view illustrating a base board and its peripheral members according to Second Variation.

FIG. 12 is a plane view illustrating the base board 20 and its peripheral members of a lens drive device with resin portions 272 according to Second Variation. The resin portions 272 according to Second Variation are arranged continuously to surround the base opening 22.

As shown in FIG. 12, each of the resin portions 272 includes a first metal-particle-containing resin portion 274 and the third resin portion 76, and as with the third resin portion 76, the first metal-particle-containing resin portions 274 are formed into an arc shape along the opening periphery 22a. As with the first metal-particle-containing resin portions 174 shown in FIG. 11, each of the first metal-particle-containing resin portions 274 connects a plurality of first conductive portions 71 and connects two third resin portions 76 adjacent to each other. Thus, each of the resin portions 272 has a ring shape where the first metal-particle-containing resin portions 274 and the third resin portions 76 are connected to each other.

The resin portions 272 continuing in such a ring manner can effectively prevent the inflow of particles from the outside into the base opening 22. Except for the shape of the first metal-particle-containing resin portions 274, the lens drive device according to Second Variation is similar to the lens drive device 2 according to the embodiment and demonstrates similar effects thereto. Incidentally, the resin portions 272 having a ring shape do not necessarily have the shape shown in FIG. 12 (the first metal-particle-containing resin portions 274 and the third resin portions 76 are connected) and may have a shape where the first metal-particle-containing resin portion (see FIG. 8C) containing the metal particles 74a is formed into a ring shape, a shape where the third resin portion containing the spacer 76a (see FIG. 8B) is formed into a ring shape, or the like.

Figure 15:
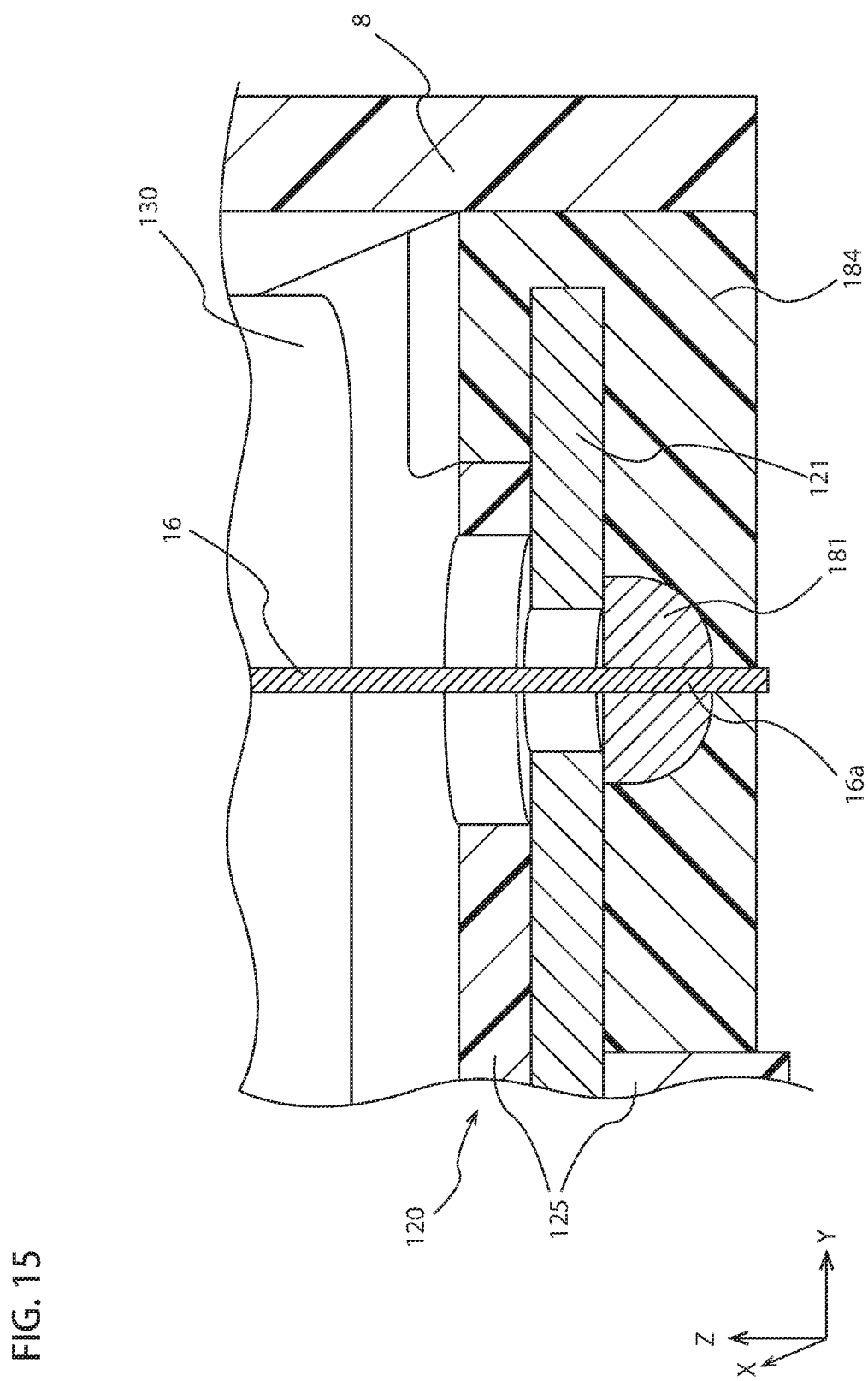
FIG. 15 is a cross-sectional view illustrating a base board and its peripheral members according to Third Variation.

In the above-mentioned embodiment, the one ends 16a of the suspension wires 16 (support portions) are electrically connected to the coil board 30, but this is not only one connection position of the suspension wires 16 to the fixed unit 4. FIG. 15 is a partial cross-sectional view illustrating a connection part of the suspension wire 16 and the fixed unit 4 in a lens drive device according to Third Variation.

In the lens drive device according to Third Variation shown in FIG. 15, the one end 16a of the suspension wire 16 passes through an outer circumference of a coil board 130 and is connected to a base board 120. Thus, a second conductive portion 181 conductively connects the one end 16a of the suspension wire 16 and a base wiring 121 (a circuit of the base board 120). Moreover, a second metal-particle-containing resin portion 184 is disposed to connect the case 8 and the base board 120, and the second conductive portion 181 is covered with the second metal-particle-containing resin portion 184. Incidentally, the base wiring 121 is covered with a base insulation portion 125 except for a vicinity of a through hole for insertion of the one end 16a of the suspension wire 16.

Incidentally, except for the connection parts of the fixed unit 4 and the one ends 16a of the suspension wires 16, the lens drive device 2 according to Third Variation has similar structure to the lens drive device 2 according to the embodiment. The lens drive device according to Third Variation demonstrates similar effects to the lens drive device 2 according to Third Variation.

DESCRIPTION OF THE REFERENCE NUMERICAL

2 . . . lens drive device
3 . . . movable unit
4 . . . fixed unit
8 . . . case
16 . . . suspension wire
16a . . . one end
18 . . . position sensor
20, 120 . . . base board
21, 121 . . . base wiring
22 . . . base opening
22a . . . opening periphery
23 . . . connector part
24 . . . plate
25, 125 . . . base insulation portion
26 . . . lateral surface
27 . . . protrusion part
30 . . . coil board
31 . . . coil wiring
31a . . . the other end
32 . . . image-stabilizer coil
34 . . . coil board opening
35 . . . coil board insulation portion
36 . . . rear surface
40 . . . lens holder
46 . . . focus coil
50 . . . rear spring
60 . . . frame
71 . . . first conductive portion
72 . . . resin portion
74 . . . first metal-particle-containing resin portion
74a . . . metal particle
76 . . . third resin portion
76a . . . spacer
80 . . . magnet
81, 181 . . . second resin portion
84, 184 . . . second metal-particle-containing resin portion
90 . . . front spring
100 . . . lens
O . . . optical axis

What is claimed is:
1. A lens drive device comprising:
a movable unit including a magnet and a lens holder for holding a lens;
a fixed unit including:
a coil board including a coil facing the magnet and configured to drive the magnet in orthogonal directions to an optical axis of the lens; and a base board disposed on the other side of the magnet across the coil board and including an opening through which the optical axis of the lens passes; and a support portion configured to relatively movably connect the movable unit to the fixed unit and support the movable unit to the fixed unit, wherein, in the fixed unit, a metal-particle-containing resin portion containing metal particles unevenly distributed in a resin covers at least one of a first conductive portion conductively connecting a circuit of the coil board and a circuit of the base board and a second conductive portion conductively connecting one end of the support portion and the circuit of the coil board or the base board.

2. The lens drive device according to claim 1, wherein the second conductive portion is disposed to overlap with the base board when viewed from the orthogonal directions to the optical axis.

3. The lens drive device according to claim 1, wherein the metal-particle-containing resin portion connects the coil board and the base board.

4. The lens drive device according to claim 3, wherein the metal-particle-containing resin portion connects a rear surface of the coil board facing the base board and a lateral surface of the base board extending in the optical axis of the lens.

5. The lens drive device according to claim 1, wherein the base board includes a coil board facing part facing the coil board and a connector part extending from the coil board facing part in the optical axis of the lens, and an entire connection part between the coil board facing part and the connector part is positioned closer to the optical axis of the lens than to an outer circumference of the coil board when viewed from the optical axis.

6. The lens drive device according to claim 1, wherein the base board includes a metallic plate having the opening, and the circuit of the base board is disposed near the coil board on the plate.

7. The lens drive device according to claim 1, wherein the metal-particle-containing resin portion includes a first metal-particle-containing resin portion covering the first conductive portion, and the first conductive portion and an opening periphery of the opening are divided by the first metal-particle-containing resin portion.

8. The lens drive device according to claim 1, wherein the metal-particle-containing resin portion includes a second metal-particle-containing resin portion covering the second conductive portion and connected to the coil board, and the base board includes a protrusion part protruding outside the outer circumference of the coil board when viewed from the optical axis of the lens and preventing the second metal-particle-containing resin portion from spreading in the orthogonal directions to the optical axis.

\* \* \* \* \*

UNITED STATES PATENT AND TRADEMARK OFFICE
CERTIFICATE OF CORRECTION

| | | |
|---|---|---|
| PATENT NO. | : 11,237,351 B2 | Page 1 of 1 |
| APPLICATION NO. | : 16/508604 | |
| DATED | : February 1, 2022 | |
| INVENTOR(S) | : Akira Suzuki | |

It is certified that error appears in the above-identified patent and that said Letters Patent is hereby corrected as shown below:

On the Title Page

Item [73] Assignee:
Change "TDK CORPORATION, Tokyo (JP)" to --TDK TAIWAN CORPORATION, Taipei City (R.O.C.), TAIWAN--.

Signed and Sealed this
Twenty-eighth Day of February, 2023

Katherine Kelly Vidal
*Director of the United States Patent and Trademark Office*